United States Patent [19]

Takashige et al.

[11] Patent Number: 5,716,696
[45] Date of Patent: Feb. 10, 1998

[54] EASY-CLEAVAGE FILM AND A METHOD OF PRODUCING THE SAME

[75] Inventors: Masao Takashige; Takeo Hayashi; Takehiro Iwamoto, all of Himeji, Japan

[73] Assignee: Idemitsu Petrochemical Co., Ltd., Tokyo, Japan

[21] Appl. No.: 564,421

[22] Filed: Nov. 29, 1995

[30] Foreign Application Priority Data

Nov. 30, 1994 [JP] Japan .................................. 6-296611

[51] Int. Cl.$^6$ ....................................................... B32B 7/02
[52] U.S. Cl. ................... 428/213; 428/474.4; 428/474.7; 428/474.9; 428/475.5; 428/910; 156/244.11
[58] Field of Search ................. 428/474.4, 474.7–474.9, 428/475.5, 910; 156/244.11

[56] References Cited

U.S. PATENT DOCUMENTS

| | | | |
|---|---|---|---|
| 5,106,693 | 4/1992 | Harada et al. | 428/412 |
| 5,480,690 | 1/1996 | Stenger et al. | 428/34.8 |
| 5,547,765 | 8/1996 | Degrassi et al. | 428/474.7 |

Primary Examiner—E. Rollins Buffalow
Attorney, Agent, or Firm—Flynn, Thiel, Boutell & Tanis, P.C.

[57] ABSTRACT

An easy-cleavage film comprising a first layer, a second layer and a third layer which contain Nylon 6 (Ny 6), meta-xylylene adipamide (MXD 6) and polyamide elastomer (PAE), in which the film is defined by (1) the content of the components of each layer, (2) the layer ratio of each layer and (3) the orientation ratio, more specifically, (1) the first layer and the third layer having 60 to 85% by weight of Ny 6 content, 15 to 40% by weight of MXD 6 content and 0.1 to 10.0% by weight of PAE content, the second layer having 0 to 40% by weight of Ny 6 content, 60 to 100% by weight of MXD 6 content and 0.1 to 10.0% by weight of PAE content (each layer having Ny 6+MXD 6+PAE=100% by weight, further, the MXD 6 content in the second layer being larger than the MXD 6 content in the first layer and the third layer), (2) the layer ratio of the first layer through the third layer being defined as 1:8:1–4:2:4, the layer ratio between the first layer (or the third layer) and the second layer being defined as 1:8–2:1, and the layer ratio between the first layer and the third layer being defined as 1:2–2:1, and (3) an orientation ratio of more than 2.8 times in both the direction of the movement of the film (MD direction) and the direction of the width of the film (TD direction).

2 Claims, 1 Drawing Sheet

EASY-CLEAVAGE FILM AND A METHOD OF PRODUCING THE SAME

BACKGROUND OF THE INVENTION

1. Field of the Invention

This invention relates to an easy-cleavage film and a method of producing the same, in which the produced easy-cleavage film can be used for, for example, the packing of foods, industrial materials, medicine, and so

2. Description of the Related Art

Conventionally, as a film having gas-barrier performance, a biaxial oriented nylon film coated with, for example, a vinylidene chloride resin is used. But, it is disadvantageous that the biaxial oriented nylon film produces a chloric gas when being burned, possibly damaging an incinerator or polluting the environment.

Consequently, as the film having a gas-barrier performance for which environmental consideration is unnecessary, namely, is environmentally safe, an ethylene-vinyl-acetate copolymer saponification film (EVOH) is used in many cases. The EVOH film has good properties, but has an inferior point in that its properties easily deteriorate under high temperature and high humidity. However, to attain a high level of gas-barrier performance, humidity resistance is required. Furthermore, the EVOH film is accompanied with a limitation of uses by reason of produced disadvantages, such as the EVOH film changing color to misty white when undergoing a hot-water treatment (such as a retort treatment) exceeding 100° C.

It is proposed that a multi-oriented film, such as Ny/EVOH/Ny and Ny/MXD 6/Ny, is prepared by using nylon (Ny) or meta-xylylene adipamide (MXD 6), resulting in a film which improves upon the aforementioned inferior points. However, these films have the utilitarian disadvantage that they are difficult to open by hand because of the deficiency of their easy-cleavage ability. Further, EVOH or MXD 6 both have a high strength, so that there is a disadvantage that a pinhole is easily produced.

As to the aforementioned easy-cleavage ability, lately, a multi-film laminated with a linear chain low-density polyethylene (L-LDPE) sealant has been increasingly used in order to facilitate protection of a substance enclosed within the film. However, inferior opening performance is inversely proportional to the improved strength of the film. Therefore, a compatible film with an easy-cleavage ability and high strength is required.

SUMMARY OF THE INVENTION

An easy-cleavage film of a first embodiment according to the present invention is characterized by having a first layer, a second layer and a third layer which contain Nylon 6 (Ny 6), meta-xylylene adipamide (MXD 6) and a polyamide elastomer (PAE), in which the film is defined as (1) a content of the aforementioned component of each layer, (2) a layer ratio of each layer and (3) an orientation ratio as the following.

(1) The first layer and the third layer have 60 to 85% by weight of the Ny 6 content, 15 to 40% by weight of the MXD 6 content and 0.1 to 10.0% by weight of the PAE content, the second layer has 0 to 40% by weight of the Ny 6 content, 60 to 100% by weight of the MXD 6 content and 0.1 to 10.0% by weight of the PAE content. (Each layer has Ny 6+MXD 6+PAE=100% by weight and, further, the MXD 6 content in the second layer is larger than the MXD 6 content in the first layer and the third layer).

The aforementioned PAE is a copolymer which is composed of a soft-segment, which is required for elastomeric properties, and a hard-segment. As the soft-segment polytetramethylene ether glycol, polypropylene-glycol or an aliphatic polyesterdiol is used. While, as the hard-segment, Nylon 12, Nylon 6 or an aromatic polyamide is used.

When the MXD 6 content in each layer is below the aforementioned range, it is difficult to cut by hand for reason of having an inferior easy-cleavage ability and linear cutting performance. On the other hand, when the MXD 6 content is above the aforementioned range, the impact strength sharply decreases so as to greatly decrease its utility.

When the PAE content in each layer is below the aforementioned range, the improvement of pinhole performance is insufficient. However, when the PAE content is above the aforementioned range, the optical character of the film decreases so as to lower the value of the product.

It is advisable for the first layer and the third layer to have 60 to 75% by weight of Ny 6 content and 25 to 40% by weight of MXD 6 content. It is advisable for the second layer to be 0 to 30% by weight of Ny 6 content and 0 to 30% by weight of MXD 6 content. Further, it is desirable for each layer to have 0.5 to 8% by weight of PAE content.

(2) The layer ratio of the first layer through the third layer is defined as 1:8:1–4:2:4, the layer ratio between the first layer (or the third layer) and the second layer is defined as 1:8–2:1, and the layer ratio between the first layer and the third layer is defined as 1:2–2:1.

Incidentally, it is advisable that the layer ratio of the first layer through the third layer is defined as 1:2:1–2:1:2, the layer ratio between the first layer (or the third layer) and the second layer is defined as 1:2–2:1, and the layer ratio between the first layer and the third layer is defined as 1:1.5–1.5:1.

(3) The film is oriented at a ratio of more than 2.8 times in both the direction of the movement of the film (MD direction) and the direction of the width of the film (TD direction).

When the orientation ratio is smaller than 2.8 times, a disadvantage in utility is produced by the film having an inferior linear cutting performance and decreased impact strength. Incidentally, it is desirable that the orientation ratio is more than 3.0 times.

The aforementioned easy-cleavage film can suitably contain therein necessary additives.

It is possible to list an anti-blocking agent (such as an inorganic filler), water repellant (such as ethylene-bis-stearate ester agent), lubricant (such as calcium stearate) and so on as the aforementioned additives.

The second embodiment according to the present invention is a method of producing the easy-cleavage film having a first layer, a second layer and a third layer which contain Nylon 6 (Ny 6), meta-xylylene adipamide (MXD 6) and a polyamide elastomer (PAE), which is characterized by defining the following: (1) the blended amount of the aforementioned raw materials for each layer, (2) the layer ratio of each layer and (3) the condition of the orientation.

(1) The first layer and the third layer are a blend of 60 to 85% by weight of Ny 6, 15 to 40% by weight of MXD 6 and 0.1 to 10.0% by weight of PAE, the second layer is a blend of 0 to 40% by weight of Ny 6, 60 to 100% by weight of MXD 6 and 0.1 to 10.0% by weight of PAE (the blended amount of each layer is Ny 6+MXD 6+PAE=100% by weight and, further, the blended amount of MXD in the second layer is larger than the blended amount of MXD 6 in the first layer and the third layer).

(2) The layer ratio of the first layer through the third layer is defined as 1:8:1–4:2:4, the layer ratio between the first layer (or the third layer) and the second layer is defined as 1:8–2:1, and the layer ratio between the first layer and the third layer is defined as 1:2–2:1.

(3) The aforementioned raw materials for forming the first layer through the third layer are melted and kneaded and, further, laminated after being extruded in a film state, and then the cooled original film is oriented as defined at more than 2.8 times of both the ratio of the direction of the movement of the film (MD direction) and of the ratio of the direction of the width of the film (TD direction).

The aforementioned orientation is facilitated by using a simultaneously biaxial orientation, such as a tubular method.

DETAILED DESCRIPTION OF THE PREFERRED EMBODIMENT(S)

EMBODIMENT 1

Figure 1:
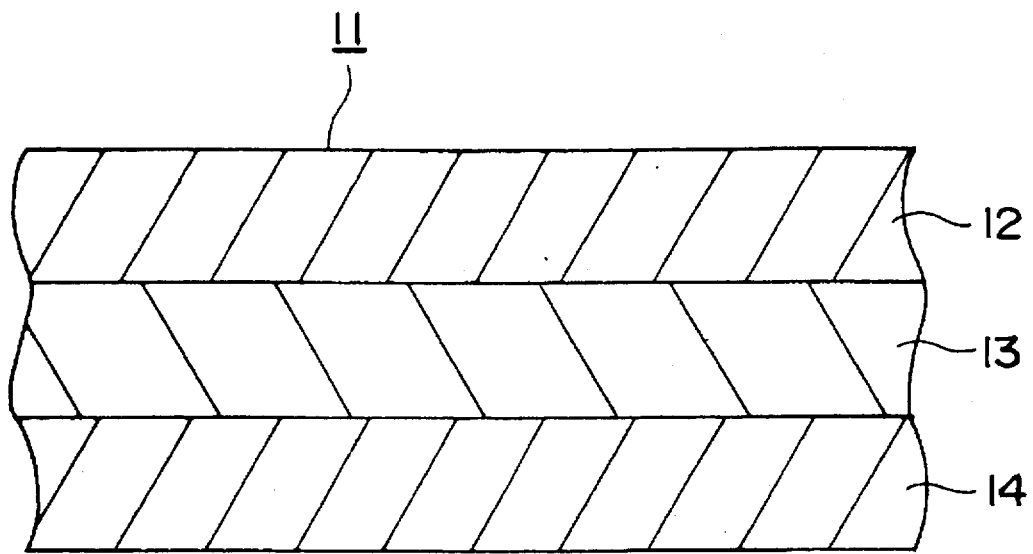
FIG. 1 is a sectional view of an easy-cleavage film according to a preferred embodiment of the present invention.

After mixing materials for making a first layer, a second layer and a third layer are respectively melted and kneaded in three extruders (40 mm in diameter) at 270° C., the molten substances are extruded from a multi-circular-die having a 90 mm diameter as a tubular three-layer film (ratio of layer, 1:1:1), and then an original film is made and immediately cooled by water.

The raw materials used for the aforementioned first layer is a blend of Nylon 6 (Ny 6), meta-xylylene adipamide (MXD 6) and polyamide elastomer (PAE), respectively, at the ratio of 67% by weight, 30% by weight and 3% by weight. The raw materials used for the aforementioned second layer is a blend of Ny 6, MXD 6 and PAE, respectively, at the ratio of 0% by weight, 97% by weight and 3% by weight. The raw materials used for the aforementioned third layer is a blend of Ny 6, MXD 6 and PAE, respectively, at the ratio of 67% by weight, 30% by weight and 3% by weight.

Nylon produced by UBE INDUSTRIES LIMITED (tradename: UBE NYLON 1023 FD, a relative viscosity $\eta r=3.6$) was used as the aforementioned Ny 6, and meta-xylylene adipamide produced by MISTUBISHI GAS CHEMICAL COMPANY INC. (tradename: MX-NYLON 6007, a relative viscosity $\eta r=2.7$) was used as the aforementioned MXD 6. Further, as the aforementioned PAE, polyamide elastomer produced by DAICEL.HüDLS CO., LTD. (tradename: DI-AMIDE-PAE, X 40 (grade)) was used. The DI-AMIDE-PAE is a polyamide elastomer of a block-copolymer having a soft-segment, such as a polyether component, and a hard-segment, such as Nylon 12.

After the original film is drawn into a pair of nip-rollers, it is heated by a heater while gas is fed into its inside, expanding the original film into a bubble by air blowing therein from a starting point of orientation, and then subjected to a simultaneous biaxial orientation in the MD direction and the TD direction by means of a tubular method by being pulled down with a pair of the nip-rollers placed at the downstream side is carried out. The orientation ratio in both the MD direction and the TD direction is 3.0.

Further, the oriented film is put into a heat treating furnace of the tenter type which is fixed at a temperature of 210° C., whereby an easy-cleavage film according to the present invention is obtained. As is shown in FIG. 1, the easy-cleavage film 11 has a three-layer laminated structure, a first layer 12, a second layer 13 and a third layer 14.

The obtained easy-cleavage film is measured by tear strength and impact strength (film-impact) and evaluated for easy-cleavage ability, linear cutting performance, pinhole resistance, gas-barrier performance and optical character. The results are shown in Table 2.

The measurement of the tear strength is facilitated by measuring Elemendorf split strength (kg/cm) following JIS-Z1702 in the direction of the orientation of the film.

The aforementioned impact strength is measured by using a film-impact tester (produced by TOYO SEIKI CO. LTD.), in which the film is measured by the impact strength needed to puncture the film when a semi-tubular pendulum (diameter; ½ inch, weight; 30 kg) is struck on the fixed ring-likely film.

The measured value I of the impact strength is defined as $\bigcirc$ for I≧5,000 kg.cm/cm and as x for I<5,000 kg.cm/cm. In I<5,000 kg.cm/cm, the efficiency as a base material for the surface is lowered, therefore, its utility as a base material for packaging liquid becomes inferior.

The aforementioned easy-cleavage ability is evaluated as the value E of the aforementioned Elemendorf split strength and defined as $\bigcirc$ for E≦7 kg/cm, Δ for 7 kg/cm<E<9 kg/cm and x for E≧9 kg/cm. When E is more than 9 kg/cm, the easy-cleavage ability is conspicuously decreased, more particularly, the linear cutting performance is immediately inferior.

The aforementioned linear cutting performance is evaluated in the following way.

More specifically, after the film is torn along a rift which is made for a predetermined distance $W_s$, for example, for a distance of 2 cm, on the film with a width of 20 cm, a width $W_e$ of the other end of the film piece is measured, and then the deviation α with the original distance $W_s$ is calculated as follows:

$$\alpha=\{(W_s-W_e)/W_s\}\times 100$$

The aforementioned measurement is conducted on 10 sheets of the film, in which the average deviation α(%) evaluated as less than ±10% is indicated with ⊚ (the linear cut performance is excellent), as ±10%≦α≦±30% is indicated with $\bigcirc$ (the linear cut performance is good), and as more than ±30% is indicated with x (the linear cut performance is insufficient). Further, more than 80% of the examined films are ±10%≦α≦±30%, and almost 20% are ±30%≦α≦±40%, which are evaluated as A (the linear cutting performance is slightly unstable). When α(%) exceeds 30%, it becomes difficult to cut the film straight.

The aforementioned pinhole resistance is evaluated along with bending resistance by using a Gerbo-tester of a MIL standard. The laminated film of the easy-cleavage film of the embodiment and a linear chain low-density polyethylene (L-LDPE, 50 μm) is used as a sample, in which after the laminated film is bent at 23° C., 50% RH, the number of produced through-holes are measured by using a liquid for detecting the pinholes. The measured evaluation is indicated with $\bigcirc$ for less than five through-holes, Δ for 6 to 19 and x for more than 20.

Evaluation of the optical character is measured by following ASTM D-1003 and indicated with $\bigcirc$ for the cases of less than 7% and with x for the cases of more than 7%.

Evaluation of the gas-barrier performance is measured by the degree oxygen-gas transferred in less than 60% RH by using a gas-transmission tester produced by MOCON CO., LTD., in which ○ shows the cases of less than 15 cc/m²,24 Hr and x shows the cases of more than 15 cc/m²,24Hr.

The total evaluation is defined as ○ for a film absent of the evaluation x as to the tear strength, the impact strength, the easy-cleavage ability, the linear cutting performance, the pinhole resistance, the gas-barrier performance and the optical character, and as x for a film which has at least one of these evaluations x.

EMBODIMENTS 2 TO 16

The easy-cleavage film relating to each embodiment is obtained like Embodiment 1. The percentage of the blend of the materials, the ratio of the layers and the orientation ratio are varied among each embodiment, as shown in Table 1. Incidentally, PAE used in Embodiments 2 to 15 is the DI-AMIDE-PAE (the tradename), X 40 (grade), and PAE used in Embodiment 16 is the DI-AMIDE-PAE (the tradename), X 4442 (grade).

The easy-cleavage films of these embodiments are, like Embodiment 1, measured for the tear strength and the impact strength and evaluated for easy-cleavage ability, linear cutting performance and so on. These results are illustrated in Table 2.

COMPARATIVE EXAMPLES 1 TO 8

A film relating to each comparative example is obtained like Embodiment 1. The component of the layers, percentage of the blend of the materials and the orientation ratio varied among each comparative example as shown in Table 3.

The easy-cleavage films of these comparative examples are, like Embodiment 1, measured by tear strength and impact strength and evaluated for easy-cleavage ability, linear cutting performance and so on. These results are illustrated in Table 4.

TABLE 1

| | | Raw Material Composition (% by weight) | | | | | | | Layer Ratio | | | Orientation Ratio | |
|---|---|---|---|---|---|---|---|---|---|---|---|---|---|
| | | ① | | ② | | ③ | | | | | | | |
| | | Ny | MX | Ny | MX | Ny | MX | PAE | ① | ② | ③ | MD | TD |
| Embodiments | 1 | 67 | 30 | 0 | 97 | 67 | 30 | 3 | 1 | 1 | 1 | 3.0 | 3.0 |
| | 2 | 67 | 30 | 0 | 97 | 67 | 30 | 3 | 2 | 1 | 2 | 3.0 | 3.0 |
| | 3 | 69 | 30 | 0 | 99 | 69 | 30 | 1 | 2 | 1 | 2 | 3.0 | 3.0 |
| | 4 | 60 | 30 | 0 | 90 | 60 | 30 | 10 | 2 | 1 | 2 | 3.0 | 3.0 |
| | 5 | 67 | 30 | 17 | 80 | 67 | 30 | 3 | 1 | 1 | 1 | 3.0 | 3.0 |
| | 6 | 67 | 30 | 37 | 60 | 67 | 30 | 3 | 1 | 1 | 1 | 3.0 | 3.0 |
| | 7 | 67 | 30 | 37 | 60 | 67 | 30 | 3 | 1 | 1 | 1 | 3.0 | 3.0 |
| | 8 | 77 | 20 | 17 | 80 | 77 | 20 | 3 | 1 | 1 | 1 | 3.0 | 3.0 |
| | 9 | 82 | 15 | 37 | 60 | 82 | 15 | 3 | 1 | 1 | 1 | 3.0 | 3.0 |
| | 10 | 67 | 30 | 37 | 60 | 67 | 30 | 3 | 1 | 2 | 1 | 3.0 | 3.0 |
| | 11 | 67 | 30 | 37 | 60 | 67 | 30 | 3 | 1 | 1 | 1 | 2.8 | 2.8 |
| | 12 | 67 | 30 | 17 | 80 | — | — | 3 | 1 | 1 | — | 3.0 | 3.0 |
| | 13 | 69.9 | 30 | 0 | 99.9 | 69.9 | 30 | 0.1 | 1 | 1 | 1 | 3.0 | 3.0 |
| | 14 | 69.9 | 30 | 16.9 | 80.0 | 69.9 | 30 | 0.1 | 1 | 1 | 1 | 3.0 | 3.0 |
| | 15 | 69.5 | 30 | 0 | 99.5 | 69.5 | 30 | 0.5 | 1 | 1 | 1 | 3.0 | 3.0 |
| | 16 | 69.5 | 30 | 0 | 99.5 | 69.5 | 30 | 0.5 | 1 | 1 | 1 | 3.0 | 3.0 |

TABLE 2

| | | Tear Strength (kg/cm) | | Easy-Cleavage Ability | Linear Cutting Performance | Impact Strength (kg·cm/cm) | Pinhole Resistance | Gas-Barrier Performance | Optical Character | Total Evaluation |
|---|---|---|---|---|---|---|---|---|---|---|
| | | MD | TD | | | | | | | |
| Embodiments | 1 | 6.5 | 6.5 | ○ | ⊙ | 6,500 ○ | ⊙ | ○ | ○ | ○ |
| | 2 | 6.0 | 6.0 | ○ | ⊙ | 7,000 ○ | ⊙ | ○ | ○ | ○ |
| | 3 | 6.0 | 6.0 | ○ | ⊙ | 7,000 ○ | ○ | ○ | ○ | ○ |
| | 4 | 6.0 | 6.0 | ○ | ○ | 7,200 ○ | ⊙ | ○ | Δ | ○ |
| | 5 | 6.3 | 6.2 | ○ | ⊙ | 7,500 ○ | ⊙ | ○ | ○ | ○ |
| | 6 | 6.0 | 6.0 | ○ | ⊙ | 7,500 ○ | ⊙ | ○ | ○ | ○ |
| | 7 | 5.5 | 5.5 | ○ | ⊙ | 7,500 ○ | ⊙ | ○ | ○ | ○ |
| | 8 | 6.5 | 6.5 | ○ | ⊙ | 7,800 ○ | ⊙ | ○ | ○ | ○ |
| | 9 | 7.0 | 7.0 | ○ | ⊙ | 8,000 ○ | ⊙ | ○ | ○ | ○ |
| | 10 | 6.5 | 6.5 | ○ | ⊙ | 7,000 ○ | ⊙ | ○ | ○ | ○ |
| | 11 | 7.0 | 7.0 | ○ | ○ | 5,500 ○ | ⊙ | ○ | ○ | ○ |
| | 12 | 6.8 | 6.6 | ○ | ⊙ | 6,400 ○ | ⊙ | ○ | ○ | ○ |
| | 13 | 6.5 | 6.5 | ○ | ⊙ | 6,500 ○ | Δ | ○ | ○ | ○ |
| | 14 | 6.3 | 6.3 | ○ | ⊙ | 7,500 ○ | Δ | ○ | ○ | ○ |
| | 15 | 6.5 | 6.5 | ○ | ⊙ | 6,500 ○ | ○ | ○ | ○ | ○ |
| | 16 | 6.5 | 6.5 | ○ | ⊙ | 6,500 ○ | Δ | ○ | ○ | ○ |

TABLE 3

| | | Raw Material Composition (% by weight) | | | | | | Layer Ratio | | | Orientation Ratio | |
|---|---|---|---|---|---|---|---|---|---|---|---|---|
| | | ① | | ② | | ③ | | | | | | |
| | | Ny | MX | Ny | MX | Ny | MX | PAE | ① | ② | ③ | MD | TD |
| *1 | 1 | 97 | 0 | — | — | — | — | 3 | 1 | 0 | 0 | 3.0 | 3.0 |
| | 2 | 87 | 10 | — | — | — | — | 3 | 1 | 0 | 0 | 3.0 | 3.0 |
| | 3 | 97 | 0 | 0 | 97 | 69 | 0 | 3 | 1 | 1 | 1 | 3.0 | 3.0 |
| | 4 | 100 | 0 | 0 | 100 | 100 | 0 | 0 | 1 | 1 | 1 | 3.0 | 3.0 |
| | 5 | 67 | 30 | 57 | 40 | 67 | 30 | 3 | 1 | 1 | 1 | 2.5 | 2.5 |
| | 6 | 0 | 100 | — | — | — | — | 0 | 1 | 0 | 0 | 3.0 | 3.0 |
| | 7 | 0 | 97 | — | — | — | — | 3 | 1 | 0 | 0 | 3.0 | 3.0 |
| | 8 | 69.95 | 97 | 0 | 99.95 | 69.95 | 30 | 0.05 | 1 | 1 | 1 | 3.0 | 3.0 |

*1 is Comparative Examples

TABLE 4

| | | Tear Strength (kg/cm) | | Easy-Cleavage Ability | Linear Cutting Performance | Impact Strength (kg·cm/cm) | Pinhole Resistance | Gas-Barrier Performance | Optical Character | Total Evaluation |
|---|---|---|---|---|---|---|---|---|---|---|
| | | MD | TD | | | | | | | |
| *1 | 1 | 8.5 | 8.5 | Δ | x | 8,000 o | o | x | o | x |
| | 2 | 7.0 | 7.5 | Δ | x | 8,000 o | o | x | o | x |
| | 3 | 8.0 | 8.0 | Δ | x | 7,000 o | o | o | o | x |
| | 4 | 8.0 | 8.0 | Δ | x | 7,000 o | x | o | o | x |
| | 5 | 9.0 | 9.0 | x | x | 5,000 o | x | x | o | x |
| | 6 | 6.5 | 6.5 | o | x | 3,000 x | x | o | o | x |
| | 7 | 6.7 | 7.0 | o | x | 3,500 x | x | o | o | x |
| | 8 | 6.5 | 6.5 | o | o | 6,500 o | x | o | o | x |

*1 is Comparative Examples

From Tables 1 and 2, it is understood that the easy-cleavage film has the first layer, the second layer and the third layer which contain Ny 6, MXD 6 and PAE, in which (1) the content of the aforementioned component of each layer, (2) the layer ratio of each layer and (3) the orientation ratio are within the predetermined range according to the present invention, so that the easy-cleavage film is sufficient in easy-cleavage ability, linear cutting performance, pinhole resistance, gas-barrier performance and optical character.

Further, the easy-cleavage film according to the present invention does not contain a chlorine-type resin, so that there is no concern of producing a chloric gas when burning, and it is environmentally safe.

On the other hand, from Tables 3 and 4, it is understood that, in comparative example 1, the film is composed of only the Ny 6 layer containing PAE. Therefore, the film is inferior in linear cutting performance and gas-barrier performance.

In comparative example 2, the film is composed of only one layer containing Ny 6 and MXD 6, in which, in addition, the amount of MXD 6 is only 10%. Therefore, the film is inferior in linear cutting performance and gas-barrier performance.

Although comparative example 3 has the first layer through the third layer each containing PAE, the amounts of PAE, Ny 6 and MXD 6 contained in each layer are not of the ratios according to the present invention, whereby the film is inferior in linear cutting performance.

Although comparative example 4 has the first layer through the third layer, the Ny 6 and MXD 6 contained in each layer are not of the ratios according to the present invention, so the film is inferior in linear cutting performance, and further, PAE is not added to each layer so the film is inferior in pinhole resistance.

Although comparative example 5 has the first layer through the third layer, the orientation ratio is low, two and a half times, so the film is inferior in easy-cleavage ability, linear cutting performance, pinhole resistance and gas-barrier performance.

Comparative example 6 has only the first layer containing MXD 6, whereby the film is inferior in linear cutting performance, impact strength and pinhole resistance.

Comparative example 7, also, has only the first layer containing MXD 6 blended with PAE, whereby the film is inferior in linear cutting performance, pinhole resistance and impact strength.

Comparative example 8 has the first layer through the third layer respectively containing PAE. However, the ratio of PAE contained in each layer is lower than the ratio according to the present invention. Therefore, the film is inferior in pinhole resistance.

What is claimed is:

1. An easy-cleavage film comprising first, second and third layers respectively laminated together in that order, said layers comprising Nylon 6, meta-xylylene adipamide and a polyamide elastomer and the content of the components making up each layer, layer thickness ratio of each layer and orientation ratio satisfying the following requirements:

the first and third layers each comprising 60 to 85% by weight of Nylon 6, 15 to 40% by weight of meta-xylylene adipamide and 0.1 to 10.0% by weight of the polyamide elastomer and the second layer comprising 0 to 40% by weight of Nylon 6, 60 to 100% by weight of meta-xylylene adipamide and 0.1 to 10% by weight of polyamide elastomer, with the Nylon 6, meta-xylylene adipamide and polyamide elastomer contents in each layer equal to 100% by weight and the meta-xylylene adipamide content in the second layer being larger than the meta-xylylene adipamide contents in the first and third layers;

the layer thickness ratio of the first layer to the second layer to the third layer being 1:8:1 to 4:2:4, with the layer thickness ratio between the first or third layer to the second layer being 1:8 to 2:1 and the layer thickness ratio between the first layer and the third layer being 1:2 to 2:1; and the orientation ratio is more than 2.8 in both the machine direction and the transverse direction of the film.

2. A method of producing an easy-cleavage film comprising first, second and third layers laminated together in that order, said layers comprising Nylon 6, meta-xylylene adipamide and a polyamide elastomer and the content of the components making up each layer, layer thickness ratio of each layer and orientation ratio satisfying the following requirements:

the first and third layers each comprising 60 to 85% by weight of Nylon 6, 15 to 40% by weight of meta-xylylene adipamide and 0.1 to 10.0% by weight of the polyamide elastomer and the second layer comprising 0 to 40% by weight of Nylon 6, 60 to 100% by weight of meta-xylylene adipamide and 0.1 to 10% by weight of polyamide elastomer, with the Nylon 6, meta-xylylene adipamide and polyamide elastomer contents in each layer equal to 100% by weight and the meta-xylylene adipamide content in the second layer being larger than the meta-xylylene adipamide contents in the first and third layers;

the layer thickness ratio of the first layer to the second layer to the third layer being 1:8:1 to 4:2:4, with the layer thickness ratio between the first or third layer to the second layer being 1:8 to 2:1 and the layer thickness ratio between the first layer and the third layer being 1:2 to 2:1; and the orientation ratio is more than 2.8 in both the machine direction and the transverse direction of the film, said method comprising the steps of melting and kneading the components for each layer;

extruding the molten and kneaded components for each layer into a film;

laminating the films for each layer together;

cooling the laminated films; and orienting the cooled laminated films more than 2.8 in both the machine direction and the transverse direction of the film to produce the easy-cleavage film.

* * * * *